H. TILDEN.
Tobacco Cutter and Nut Cracker.
No. 55,177. Patented May 29, 1866.
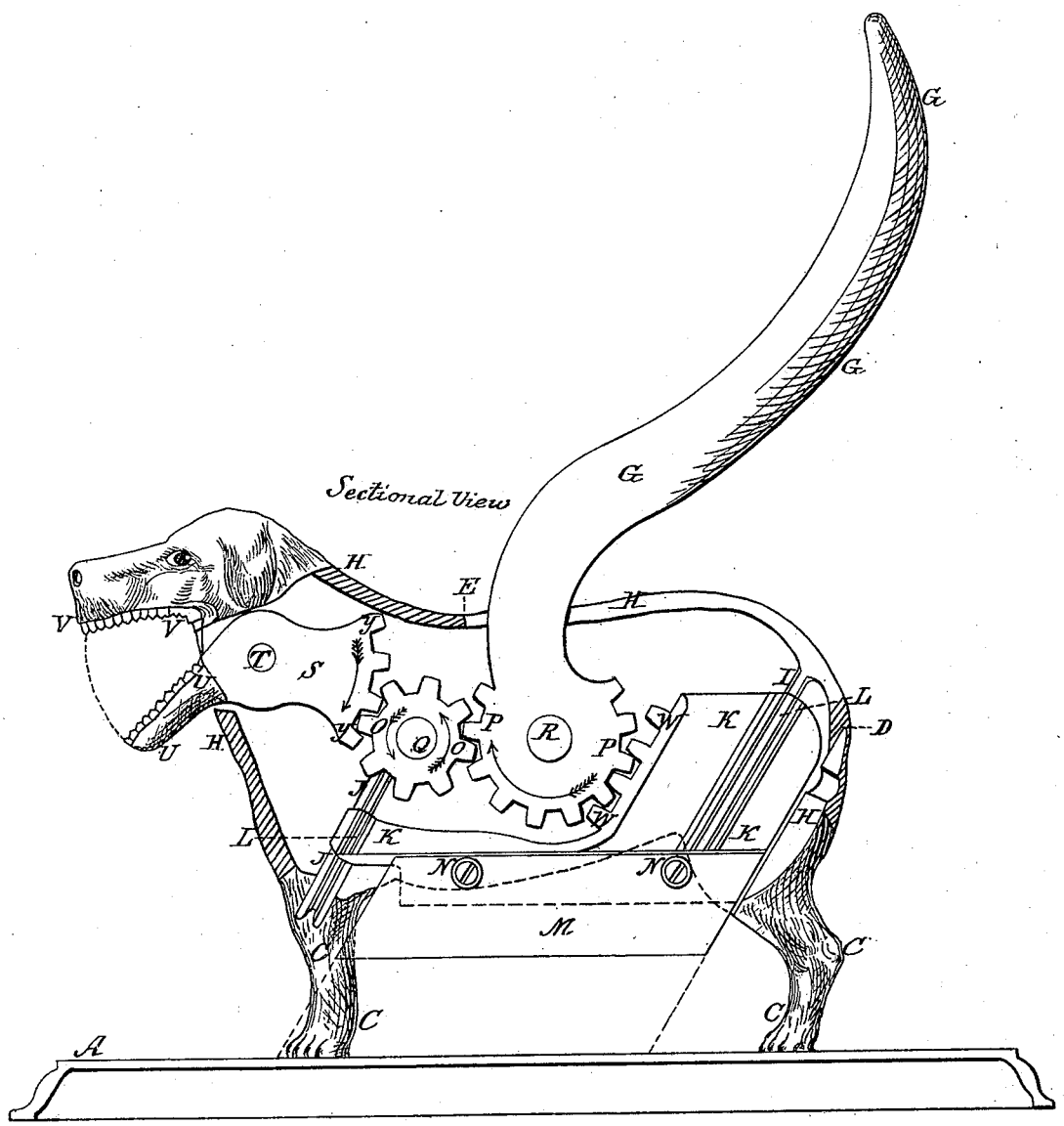

UNITED STATES PATENT OFFICE.

HOWARD TILDEN, OF BOSTON, MASSACHUSETTS.

IMPROVEMENT IN TOBACCO-CUTTER AND NUT-CRACKER.

Specification forming part of Letters Patent No. 55,177, dated May 29, 1866.

*To all whom it may concern:*

Be it known that I, HOWARD TILDEN, of Boston, in the county of Suffolk and State of Massachusetts, have invented an Improvement in Tobacco-Cutters and Nut-Crackers; and I do hereby declare that the following is a full and exact description of the same, reference being had to the accompanying drawing, and to the letters and figures marked thereon.

The instrument of my invention herein described is intended for cutting manufactured tobacco and also for cracking nuts, both of these operations being effected by means of a lever and toothed wheels acting upon a knife and upon a lower movable jaw. The gears and segments are contained within a case having the form of a dog or other animal, the tail being used as a lever and the mouth serving as a nut-cracker, in which one of the jaws is fixed and the other is movable.

In the drawing the base or stand of the implement is represented at A, to which are attached the four legs C, which support the case H and the contained mechanism.

A narrow vertical slot extends from the point marked D to the point marked E, through which the lever G rises and falls when the implement is in use.

Near the rear of the case H a diagonal traverse bar or guide, I, is attached, sloping downward and forward. Near the front of the case there is a similar guide-bar, J, parallel with the bar I. The knife-holder K is provided with four grooves, L, (two upon each side,) parallel with each other, and fitted so as to traverse freely upon the bars I and J.

The knife or cutter M is screwed to the holder K at N N', and the extent of the traverse upon the guide-bars must be sufficient to allow the knife to come in contact with the surface of the base A, as shown by the dotted lines.

The knife-holder K is formed, as represented in the drawing, with space at the front part for the pinion O, which turns on the stud Q, and the toothed wheel P, which forms the end of the lever G and turns on the center R. This segment-wheel P is a part of the lever G, and its teeth play in the toothed rack W, formed upon the inner part of the knife-holder K. When the lever G is depressed the teeth of the wheel P, playing in the rack W, force the knife M down upon the platform A. At the same time the pinion O, turning in the direction of the arrow, moves the short arm S of the bent lever U S, which is provided with teeth Y and has at its opposite end the jaw U. As the teeth Y move downward the jaw U rises and moves toward the fixed jaw V, turning on the pivot T as a center.

What I claim, and desire to secure by Letters Patent, is—

1. A tobacco-cutter and nut-cracker having the operating-lever in the form of the tail of a dog or other animal, and the jaws that hold the nut corresponding to the mouth of an animal, the operating mechanism, or its equivalent, being contained in the case H, as herein described.

2. The combination of the traversing knife or cutter, operated as herein set forth, with the jaw U and the case H, constructed as herein set forth.

HOWARD TILDEN.

In presence of—
RICHARD SMITH,
WM. H. WARNE.